US007393382B2

(12) United States Patent
Givens (10) Patent No.: US 7,393,382 B2
(45) Date of Patent: Jul. 1, 2008

(54) TEMPERATURE-BASED BREAKTHROUGH DETECTION AND PRESSURE SWING ADSORPTION SYSTEMS AND FUEL PROCESSING SYSTEMS INCLUDING THE SAME

(75) Inventor: James A. Givens, Bend, OR (US)

(73) Assignee: IDATECH LLC, Bend, OR (US)

( * ) Notice: Subject to any disclaimer, the term of this patent is extended or adjusted under 35 U.S.C. 154(b) by 406 days.

(21) Appl. No.: 11/055,843

(22) Filed: Feb. 10, 2005

(65) Prior Publication Data

US 2006/0130650 A1   Jun. 22, 2006

Related U.S. Application Data (60) Provisional application No. 60/638,086, filed on Dec. 20, 2004.

(51) Int. Cl.
*B01D 53/02* (2006.01)
(52) U.S. Cl. ............ 95/14; 95/96; 95/99; 95/100; 95/103; 95/105; 96/112; 96/130; 96/144
(58) Field of Classification Search ............ 95/14, 95/96, 97, 98, 99, 100, 105, 130, 103; 96/112, 96/130, 143, 144
See application file for complete search history.

(56) References Cited

U.S. PATENT DOCUMENTS

| | | | |
|---|---|---|---|
| 2,751,034 A | 6/1956 | Ringo et al. |
| 3,487,608 A | 1/1970 | Graäff |
| 3,564,816 A | 2/1971 | Batta |
| 3,986,849 A | 10/1976 | Fuderer et al. |
| 4,038,054 A | 7/1977 | Gräff |
| 4,272,265 A | 6/1981 | Snyder |
| 4,406,675 A | 9/1983 | Dangieri et al. |
| 4,452,612 A | 6/1984 | Mattia |
| 4,469,494 A | 9/1984 | van Weenen |
| 4,685,938 A | 8/1987 | Oliker |
| 4,693,730 A | 9/1987 | Miller et al. |
| 4,758,253 A | 7/1988 | Davidson et al. |
| 4,787,417 A | 11/1988 | Windsor, Jr. |
| 4,832,711 A | 5/1989 | Christel, Jr. et al. |
| 4,925,464 A | 5/1990 | Rabenau et al. |
| 4,941,894 A | 7/1990 | Black |
| 4,968,334 A | 11/1990 | Hilton |
| 5,112,367 A | 5/1992 | Hill |
| 5,114,441 A | 5/1992 | Kanner et al. |

(Continued)

*Primary Examiner*—Robert A Hopkins
(74) *Attorney, Agent, or Firm*—Dascenzo Intellectual Property Law, P.C.

(57) ABSTRACT

Pressure swing adsorption (PSA) assemblies with temperature-based breakthrough detection systems, as well as to hydrogen-generation assemblies and/or fuel cell systems containing the same, and to methods of operating the same. The detection systems are adapted to detect a measured temperature associated with adsorbent in an adsorbent bed of a PSA assembly and to control the operation of at least the PSA assembly responsive at least in part thereto, such as responsive to the relationship between the measured temperature and at least one reference temperature. The reference temperature may include a stored value, a previously measured temperature and/or a temperature measured elsewhere in the PSA assembly. In some embodiments, the reference temperature is associated with adsorbent downstream from the adsorbent from which the measured temperature is detected. In some embodiments, the PSA cycle and/or components thereof are determined at least in part by the relationship between the measured and reference temperatures.

34 Claims, 3 Drawing Sheets

U.S. PATENT DOCUMENTS

| | | |
|---|---|---|
| 5,133,784 A | 7/1992 | Boudet et al. |
| 5,176,722 A | 1/1993 | Lemcoff et al. |
| 5,256,172 A | 10/1993 | Keefer |
| 5,256,174 A | 10/1993 | Kai et al. |
| 5,268,021 A | 12/1993 | Hill et al. |
| 5,296,017 A | 3/1994 | Kono et al. |
| 5,366,541 A | 11/1994 | Hill et al. |
| 5,407,465 A | 4/1995 | Schaub et al. |
| 5,441,559 A | 8/1995 | Petit et al. |
| RE35,099 E | 11/1995 | Hill |
| 5,487,775 A | 1/1996 | LaCava et al. |
| 5,593,478 A | 1/1997 | Hill et al. |
| 5,730,778 A | 3/1998 | Hill et al. |
| 5,807,423 A | 9/1998 | Lemcoff et al. |
| 5,814,130 A | 9/1998 | Lemcoff et al. |
| 5,814,131 A | 9/1998 | Lemcoff et al. |
| 5,820,656 A | 10/1998 | Lemcoff et al. |
| 5,861,137 A | 1/1999 | Edlund |
| 5,891,217 A | 4/1999 | Lemcoff et al. |
| 5,979,440 A | 11/1999 | Honkonen et al. |
| 5,997,594 A | 12/1999 | Edlund et al. |
| 6,045,933 A | 4/2000 | Okamoto |
| 6,051,050 A | 4/2000 | Keefer et al. |
| 6,056,804 A | 5/2000 | Keefer et al. |
| 6,063,161 A | 5/2000 | Keefer et al. |
| 6,068,680 A | 5/2000 | Kulish et al. |
| 6,143,056 A | 11/2000 | Smolarek et al. |
| 6,168,422 B1 | 1/2001 | Motyka et al. |
| 6,176,897 B1 | 1/2001 | Keefer |
| 6,221,117 B1 | 4/2001 | Edlund et al. |
| 6,311,719 B1 | 11/2001 | Hill et al. |
| 6,379,645 B1 | 4/2002 | Bucci et al. |
| 6,406,523 B1 | 6/2002 | Connor et al. |
| 6,451,095 B1 | 9/2002 | Keefer et al. |
| 6,457,485 B2 | 10/2002 | Hill et al. |
| 6,471,744 B1 | 10/2002 | Hill |
| 6,483,001 B2 | 11/2002 | Golden et al. |
| 6,497,856 B1 | 12/2002 | Lomax, Jr. et al. |
| 6,514,318 B2 | 2/2003 | Keefer |
| 6,514,319 B2 | 2/2003 | Keefer et al. |
| 6,565,627 B1 | 5/2003 | Golden et al. |
| 6,576,043 B2 | 6/2003 | Zwilling et al. |
| 6,623,719 B2 | 9/2003 | Lomax, Jr. et al. |
| 6,627,338 B2 | 9/2003 | St-Pierre et al. |
| 6,635,372 B2 | 10/2003 | Gittleman |
| 6,651,653 B1 | 11/2003 | Honkonen et al. |
| 6,658,894 B2 | 12/2003 | Golden et al. |
| 6,660,064 B2 | 12/2003 | Golden et al. |
| 6,681,764 B1 | 1/2004 | Honkonen et al. |
| 6,691,702 B2 | 2/2004 | Appel et al. |
| 6,692,545 B2 | 2/2004 | Gittleman et al. |
| 6,698,423 B1 | 3/2004 | Honkonen et al. |
| 6,699,307 B1 | 3/2004 | Lomax, Jr. |
| 6,712,087 B2 | 3/2004 | Hill et al. |
| RE38,493 E | 4/2004 | Keefer et al. |
| 6,755,895 B2 | 6/2004 | Lomax, Jr et al. |
| 6,770,390 B2 | 8/2004 | Golden et al. |
| 6,814,787 B2 | 11/2004 | Golden et al. |
| 2001/0045061 A1 | 11/2001 | Edlund et al. |
| 2002/0004157 A1 | 1/2002 | Keefer et al. |
| 2002/0085970 A1 | 7/2002 | Sederquist et al. |
| 2002/0114747 A1 | 8/2002 | Marchand et al. |
| 2002/0127442 A1 | 9/2002 | Connor et al. |
| 2002/0168306 A1 | 11/2002 | Gittleman |
| 2003/0008186 A1 | 1/2003 | Dickman et al. |
| 2003/0070550 A1 | 4/2003 | Keefer et al. |
| 2003/0143448 A1 | 7/2003 | Keefer |
| 2003/0157390 A1 | 8/2003 | Keefer et al. |
| 2003/0192251 A1 | 10/2003 | Edlund et al. |
| 2003/0196550 A1 | 10/2003 | Keefer et al. |
| 2003/0205131 A1 | 11/2003 | Golden et al. |
| 2003/0223926 A1 | 12/2003 | Edlund et al. |
| 2004/0005492 A1 | 1/2004 | Keefer et al. |
| 2004/0011198 A1 | 1/2004 | Keefer et al. |
| 2004/0074388 A1 | 4/2004 | Lomax, Jr. |
| 2004/0131911 A1 | 7/2004 | Kaufmann et al. |
| 2004/0131912 A1 | 7/2004 | Keefer et al. |
| 2004/0163534 A1 | 8/2004 | Lomax, Jr. |
| 2004/0197616 A1 | 10/2004 | Edlund et al. |
| 2004/0250472 A1 | 12/2004 | Okada et al. |

TEMPERATURE-BASED BREAKTHROUGH DETECTION AND PRESSURE SWING ADSORPTION SYSTEMS AND FUEL PROCESSING SYSTEMS INCLUDING THE SAME

RELATED APPLICATION

This application claims priority to U.S. Provisional Patent Application Ser. No. 60/638,086, which was filed on Dec. 20, 2004, and the complete disclosure of which is hereby incorporated by reference for all purposes.

FIELD OF THE DISCLOSURE

The present disclosure is directed generally to pressure swing adsorption systems and hydrogen-generation and/or cell systems incorporating the same, and more particularly to such systems that utilize a temperature-based breakthrough detection system.

BACKGROUND OF THE DISCLOSURE

A hydrogen-generation assembly is an assembly that converts one or more feedstocks into a product stream containing hydrogen gas as a majority component. The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen into water and electricity. In such fuel cells, the hydrogen is the fuel, the oxygen is the oxidant, and the water is the reaction product. Fuel cells typically require high purity hydrogen gas to prevent the fuel cells from being damaged during use. The product stream from a hydrogen-generation assembly may contain impurities, illustrative examples of which include one or more of carbon monoxide, carbon dioxide, methane, unreacted feedstock, and water. Therefore, there is a need in many conventional fuel cell systems to include suitable structure for removing impurities from the product hydrogen stream.

A pressure swing adsorption (PSA) process is an example of a mechanism that may be used to remove impurities from an impure hydrogen gas stream by selective adsorption of one or more of the impurities present in the impure hydrogen stream. The adsorbed impurities can be subsequently desorbed and removed from the PSA assembly. PSA is a pressure-driven separation process that utilizes a plurality of adsorbent beds. The beds are cycled through a series of steps, such as pressurization, separation (adsorption), depressurization (desorption), and purge steps to selectively remove impurities from the hydrogen gas and then desorb the impurities. A concern when using a PSA assembly is preventing breakthrough, which refers to when the adsorbent in a bed has been sufficiently saturated in adsorbed impurities that the impurities pass through the bed and thereby remain with the hydrogen gas instead of being retained in the bed. Conventionally, breakthrough prevention requires either expensive composition-based detectors, such as carbon monoxide detectors, to determine when even a few parts per million (ppm) of carbon monoxide have passed through a bed, or intentional underperformance of the PSA assembly. By this it is meant that the PSA assembly is operated inefficiently, with each bed being used for impurity adsorption for only a subset of its capacity to provide a potentially wide margin of unused adsorbent and thereby hopefully prevent breakthrough. An advantage of such a process is that the cost and equipment required is reduced; however, the lack of actual breakthrough detection and the inefficient operation of the system may outweigh the cost and equipment savings, especially when it is realized that the composition of the stream to be purified may fluctuate due to malfunctions or other causes elsewhere in the hydrogen-generation assembly.

SUMMARY OF THE DISCLOSURE

The present disclosure is directed to PSA assemblies with temperature-based breakthrough detection systems, as well as to hydrogen-generation assemblies and/or fuel cell systems containing the same, and to methods of operating the same. The PSA assemblies include at least one adsorbent bed, and typically a plurality of adsorbent beds, that include an adsorbent region including adsorbent adapted to remove impurities from a mixed gas stream containing hydrogen gas as a majority component and other gases. The mixed gas stream may be produced by a hydrogen-producing region of a fuel processing system, and the PSA assembly may produce a product hydrogen stream that is consumed by a fuel cell stack to provide a fuel cell system that produces electrical power. The PSA assembly includes a temperature-based breakthrough detection system that is adapted to monitor at least one temperature associated with the adsorbent in each bed and responsive at least in part to the measured temperature to control the operation of at least the PSA assembly, and optionally other components of the hydrogen-generation assembly and/or fuel cell system utilized therewith. The breakthrough detection system may be implemented to control the operation of at least the PSA assembly to prevent actual breakthrough from occurring. Responsive at least in part to the measured temperature, the system may be adapted, in some embodiments, to shutdown the PSA assembly and/or generate at least one alert or other notification. In some embodiments, the detection system is adapted to determine at least the time of the adsorption step utilized by the PSA assembly, if not the total PSA cycle time. In some embodiments, the detection system is adapted to regulate the total PSA cycle time and/or components thereof responsive at least in part to the measured temperature and/or the detection of a breakthrough condition. In some embodiments, the measured temperature is compared to a reference temperature. In some embodiments, the reference temperature is another measured temperature of the adsorbent or other portion of the PSA assembly. In some embodiments, the reference temperature is a previously measured or selected temperature, including a stored temperature or threshold value.

DETAILED DESCRIPTION AND BEST MODE OF THE DISCLOSURE

Figure 1:
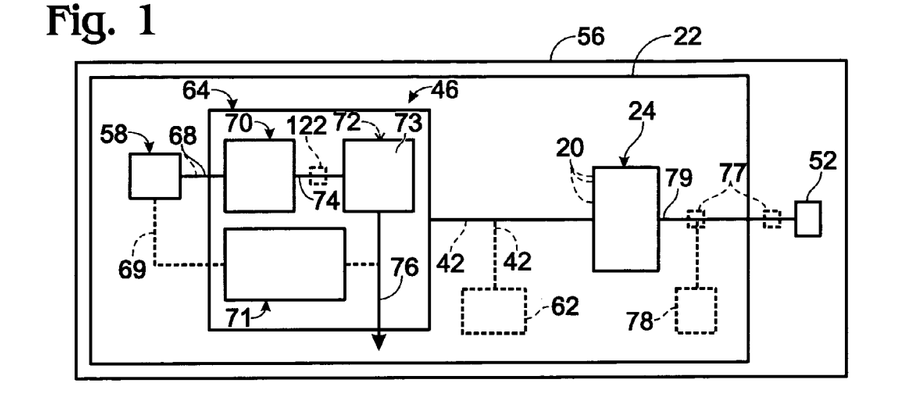
FIG. 1 is a schematic view of an illustrative example of an energy producing and consuming assembly that includes a hydrogen-generation assembly with an associated feedstock delivery system and a fuel processing system, as well as a fuel cell stack, and an energy-consuming device.

FIG. 1 illustrates schematically an example of an energy producing and consuming assembly 56. The energy producing and consuming assembly 56 includes an energy-producing system 22 and at least one energy-consuming device 52 adapted to exert an applied load on the energy-producing system 22. In the illustrated example, the energy-producing system 22 includes a fuel cell stack 24 and a hydrogen-generation assembly 46. More than one of any of the illustrated components may be used without departing from the scope of the present disclosure. The energy-producing system may include additional components that are not specifically illustrated in the schematic figures, such as air delivery systems, heat exchangers, sensors, controllers, flow-regulating devices, fuel and/or feedstock delivery assemblies, heating assemblies, cooling assemblies, and the like. System 22 may also be referred to as a fuel cell system.

As discussed in more detail herein, hydrogen-generation assemblies and/or fuel cell systems according to the present disclosure include a separation assembly that includes at least one pressure swing adsorption (PSA) assembly that is adapted to increase the purity of the hydrogen gas that is produced in the hydrogen-generation assembly and/or consumed in the fuel cell stack. In a PSA process, gaseous impurities are removed from a stream containing hydrogen gas. PSA is based on the principle that certain gases, under the proper conditions of temperature and pressure, will be adsorbed onto an adsorbent material more strongly than other gases. These impurities may thereafter be desorbed and removed, such as in the form of a byproduct stream. The success of using PSA for hydrogen purification is due to the relatively strong adsorption of common impurity gases (such as, but not limited to, CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material.

As discussed in more detail herein, a PSA process typically involves repeated, or cyclical, application of at least pressurization, separation (adsorption), depressurization (desorption), and purge steps, or processes, to selectively remove impurities from the hydrogen gas and then desorb the impurities. Accordingly, the PSA process may be described as being adapted to repeatedly enable a PSA cycle of steps, or stages, such as the above-described steps. The degree of separation is affected by the pressure difference between the pressure of the mixed gas stream and the pressure of the byproduct stream. Accordingly, the desorption step will typically include reducing the pressure within the portion of the PSA assembly containing the adsorbed gases, and optionally may even include drawing a vacuum (i.e., reducing the pressure to less than atmospheric or ambient pressure) on that portion of the assembly. Similarly, increasing the feed pressure of the mixed gas stream to the adsorbent regions of the PSA assembly may beneficially affect the degree of separation during the adsorption step.

As illustrated schematically in FIG. 1, the hydrogen-generation assembly 46 includes at least a fuel processing system 64 and a feedstock delivery system 58, as well as the associated fluid conduits interconnecting various components of the system. As used herein, the term "hydrogen-generation assembly" may be used to refer to the fuel processing system 64 and associated components of the energy-producing system, such as feedstock delivery systems 58, heating assemblies, separation regions or devices, air delivery systems, fuel delivery systems, fluid conduits, heat exchangers, cooling assemblies, sensor assemblies, flow regulators, controllers, etc. All of these illustrative components are not required to be included in any hydrogen-generation assembly or used with any fuel processing system according to the present disclosure. Similarly, other components may be included or used as part of the hydrogen-generation assembly.

Regardless of its construction or components, the feedstock delivery system 58 is adapted to deliver to the fuel processing system 64 one or more feedstocks via one or more streams, which may be referred to generally as feedstock supply stream(s) 68. In the following discussion, reference may be made only to a single feedstock supply stream, but is within the scope of the present disclosure that two or more such streams, of the same or different composition, may be used. In some embodiments, air may be supplied to the fuel processing system 64 via a blower, fan, compressor or other suitable air delivery system, and/or a water stream may be delivered from a separate water source.

Fuel processing system 64 includes any suitable device(s) and/or structure(s) that are configured to produce hydrogen gas from the feedstock supply stream(s) 68. As schematically illustrated in FIG. 1, the fuel processing system 64 includes a hydrogen-producing region 70. Accordingly, fuel processing system 64 may be described as including a hydrogen-producing region 70 that produces a hydrogen-rich stream 74 that includes hydrogen gas as a majority component from the feedstock supply stream. While stream 74 contains hydrogen gas as its majority component, it also contains other gases, and as such may be referred to as a mixed gas stream that contains hydrogen gas and other gases. Illustrative, non-exclusive examples of these other gases, or impurities, include one or more of such illustrative impurities as carbon monoxide, carbon dioxide, water, methane, and unreacted feedstock.

Illustrative examples of suitable mechanisms for producing hydrogen gas from feedstock supply stream 68 include steam reforming and autothermal reforming, in which reforming catalysts are used to produce hydrogen gas from a feedstock supply stream 68 containing water and at least one carbon-containing feedstock. Other examples of suitable mechanisms for producing hydrogen gas include pyrolysis and catalytic partial oxidation of a carbon-containing feedstock, in which case the feedstock supply stream 68 does not contain water. Still another suitable mechanism for producing hydrogen gas is electrolysis, in which case the feedstock is water. Illustrative examples of suitable carbon-containing feedstocks include at least one hydrocarbon or alcohol. Illustrative examples of suitable hydrocarbons include methane, propane, natural gas, diesel, kerosene, gasoline and the like. Illustrative examples of suitable alcohols include methanol, ethanol, and polyols, such as ethylene glycol and propylene glycol.

The hydrogen-generation assembly 46 may utilize more than a single hydrogen-producing mechanism in the hydrogen-producing region 70 and may include more than one hydrogen-producing region. Each of these mechanisms is driven by, and results in, different thermodynamic balances in the hydrogen-generation assembly 46. Accordingly, the hydrogen-generation assembly 46 may further include a temperature modulating assembly 71, such as a heating assembly and/or a cooling assembly. The temperature modulating assembly 71 may be configured as part of the fuel processing system 64 or may be an external component that is in thermal and/or fluid communication with the hydrogen-producing region 70. The temperature modulating assembly 71 may consume a fuel stream, such as to generate heat. While not required in all embodiments of the present disclosure, the fuel stream may be delivered from the feedstock delivery system. For example, and as indicated in dashed lines in FIG. 1, this fuel, or feedstock, may be received from the feedstock delivery system 58 via a fuel supply stream 69. The fuel supply stream 69 may include combustible fuel or, alternatively, may include fluids to facilitate cooling. The temperature modulating assembly 71 may also receive some or all of its feedstock from other sources or supply systems, such as from additional storage tanks. It may also receive the air stream from any suitable source, including the environment within which the assembly is used. Blowers, fans and/or compressors may be used to provide the air stream, but this is not required to all embodiments.

The temperature modulating assembly 71 may include one or more heat exchangers, burners, combustion systems, and other such devices for supplying heat to regions of the fuel processing system and/or other portions of assembly 56. Depending on the configuration of the hydrogen-generation assembly 46, the temperature modulating assembly 71 may also, or alternatively, include heat exchangers, fans, blowers, cooling systems, and other such devices for cooling regions of the fuel processing system 64 or other portions of assembly 56. For example, when the fuel processing system 64 is configured with a hydrogen-producing region 70 based on steam reforming or another endothermic reaction, the temperature modulating assembly 71 may include systems for supplying heat to maintain the temperature of the hydrogen-producing region 70 and the other components in the proper range.

When the fuel processing system is configured with a hydrogen-producing region 70 based on catalytic partial oxidation or another exothermic reaction, the temperature modulating assembly 71 may include systems for removing heat, i.e., supplying cooling, to maintain the temperature of the fuel processing system in the proper range. As used herein, the term "heating assembly" is used to refer generally to temperature modulating assemblies that are configured to supply heat or otherwise increase the temperature of all or selected regions of the fuel processing system. As used herein, the term "cooling assembly" is used to refer generally to temperature moderating assemblies that are configured to cool, or reduce the temperature of, all or selected regions of the fuel processing system.

Figure 2:
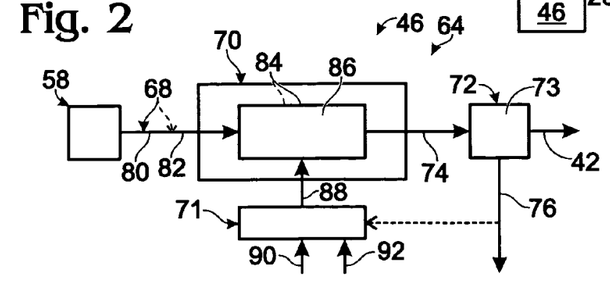
FIG. 2 is a schematic view of a hydrogen-producing assembly in the form of a steam reformer adapted to produce a reformate stream containing hydrogen gas and other gases from water and at least one carbon-containing feedstock.

In FIG. 2, an illustrative example of a hydrogen-generation assembly 46 that includes fuel processing system 64 with a hydrogen-producing region 70 that is adapted to produce mixed gas stream 74 by steam reforming one or more feedstock supply streams 68 containing water 80 and at least one carbon-containing feedstock 82. As illustrated, region 70 includes at least one reforming catalyst bed 84 containing one or more suitable reforming catalysts 86. In the illustrative example, the hydrogen-producing region may be referred to as a reforming region, and the mixed gas stream may be referred to as a reformate stream.

As also shown in FIGS. 1 and 2, the mixed gas stream is adapted to be delivered to a separation region, or assembly, 72 that includes at least one PSA assembly 73. PSA assembly 73 separates the mixed gas (or reformate) stream into product hydrogen stream 42 and at least one byproduct stream 76 that contains at least a substantial portion of the impurities, or other gases, present in mixed gas stream 74. Byproduct stream 76 may contain no hydrogen gas, but it typically will contain some hydrogen gas. While not required, it is within the scope of the present disclosure that fuel processing system 64 may be adapted to produce one or more byproduct streams containing sufficient amounts of hydrogen (and/or other) gas (es) to be suitable for use as a fuel, or feedstock, stream for a heating assembly for the fuel processing system. In some embodiments, the byproduct stream may have sufficient fuel value (i.e., hydrogen and/or other combustible gas content) to enable the heating assembly, when present, to maintain the hydrogen-producing region at a desired operating temperature or within a selected range of temperatures.

As illustrated in FIG. 2, the hydrogen-generation assembly includes a temperature modulating assembly in the form of a heating assembly 71 that is adapted to produce a heated exhaust stream 88 that is adapted to heat at least the reforming region of the hydrogen-generation assembly. It is within the scope of the present disclosure that stream 88 may be used to heat other portions of the hydrogen-generation assembly and/or energy-producing system 22.

As indicated in dashed lines in FIGS. 1 and 2, it is within the scope of the present disclosure that the byproduct stream from the PSA assembly may form at least a portion of the fuel stream for the heating assembly. Also shown in FIG. 2 are air stream 90, which may be delivered from any suitable air source, and fuel stream 92, which contains any suitable combustible fuel suitable for being combusted with air in the heating assembly. Fuel stream 92 may be used as the sole fuel stream for the heating assembly, but as discussed, it is also within the scope of the disclosure that other combustible fuel streams may be used, such as the byproduct stream from the PSA assembly, the anode exhaust stream from a fuel cell stack, etc. When the byproduct or exhaust streams from other components of system 22 have sufficient fuel value, fuel stream 92 may not be used. When they do not have sufficient fuel value, are used for other purposes, or are not being generated, fuel stream 92 may be used instead or in combination.

Illustrative examples of suitable fuels include one or more of the above-described carbon-containing feedstocks, although others may be used. As an illustrative example of temperatures that may be achieved and/or maintained in hydrogen-producing region 70 through the use of heating assembly 71, steam reformers typically operate at temperatures in the range of 200° C. and 900° C. Temperatures outside of this range are within the scope of the disclosure. When the carbon-containing feedstock is methanol, the steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or a similar alcohol, a temperature range of approximately 400-900° C. will typically be used for the steam reforming reaction. Illustrative subsets of this range include 750-850° C., 650-750° C., 700-800° C., 700-900° C., 500-800° C., 400-600° C., and 600-800° C.

It is within the scope of the present disclosure that the separation region may be implemented within system 22 anywhere downstream from the hydrogen-producing region and upstream from the fuel cell stack. In the illustrative example shown schematically in FIG. 1, the separation region is depicted as part of the hydrogen-generation assembly, but this construction is not required. It is also within the scope of the present disclosure that the hydrogen-generation assembly may utilize a chemical or physical separation process in addition to PSA assembly 73 to remove or reduce the concentration of one or more selected impurities from the mixed gas stream. When separation assembly 72 utilizes a separation process in addition to PSA, the one or more additional processes may be performed at any suitable location within system 22 and are not required to be implemented with the PSA assembly. An illustrative chemical separation process is the use of a methanation catalyst to selectively reduce the concentration of carbon monoxide present in stream 74. Other illustrative chemical separation processes include partial oxidation of carbon monoxide to form carbon dioxide and water-gas shift reactions to produce hydrogen gas and carbon dioxide from water and carbon monoxide. Illustrative physical separation processes include the use of a physical membrane or other barrier adapted to permit the hydrogen gas to flow therethrough but adapted to prevent at least selected impurities from passing therethrough. These membranes may be referred to as being hydrogen-selective membranes. Illustrative examples of suitable membranes are formed from palladium or a palladium alloy and are disclosed in the references incorporated herein.

The hydrogen-generation assembly 46 preferably is adapted to produce at least substantially pure hydrogen gas, and even more preferably, the hydrogen-generation assembly is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% or even 99.9% pure. Illustrative, nonexclusive examples of suitable fuel processing systems are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference for all purposes.

Hydrogen from the fuel processing system 64 may be delivered to one or more of the storage device 62 and the fuel cell stack 24 via product hydrogen stream 42. Some or all of hydrogen stream 42 may additionally, or alternatively, be delivered, via a suitable conduit, for use in another hydrogen-consuming process, burned for fuel or heat, or stored for later use. With reference to FIG. 1, the hydrogen gas used as a proton source, or reactant, for fuel cell stack 24 may be delivered to the stack from one or more of fuel processing system 64 and storage device 62. Fuel cell stack 24 includes at least one fuel cell 20, and typically includes a plurality of fluidly and electrically interconnected fuel cells. When these cells are connected together in series, the power output of the fuel cell stack is the sum of the power outputs of the individual cells. The cells in stack 24 may be connected in series, parallel, or combinations of series and parallel configurations.

Figure 3:
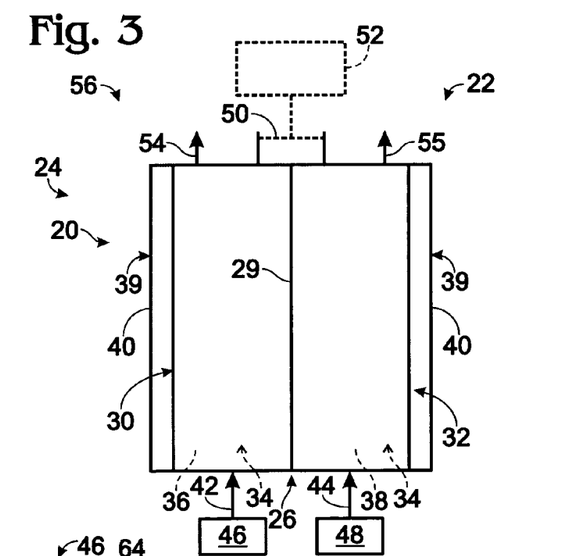
FIG. 3 is a schematic view of a fuel cell, such as may form part of a fuel cell stack used with a hydrogen-generation assembly according to the present disclosure.

FIG. 3 illustrates schematically a fuel cell 20, one or more of which may be configured to form fuel cell stack 24. The fuel cell stacks of the present disclosure may utilize any suitable type of fuel cell, and preferably fuel cells that receive hydrogen and oxygen as proton sources and oxidants. Illustrative examples of types of fuel cells include proton exchange membrane (PEM) fuel cells, alkaline fuel cells, solid oxide fuel cells, molten carbonate fuel cells, phosphoric acid fuel cells, and the like. For the purpose of illustration, an exemplary fuel cell 20 in the form of a PEM fuel cell is schematically illustrated in FIG. 3.

Proton exchange membrane fuel cells typically utilize a membrane-electrode assembly 26 consisting of an ion exchange, or electrolytic, membrane 29 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of the bipolar plate assemblies that are discussed in more detail herein. The supporting plates 40 of fuel cells 20 carry the relative voltage potentials produced by the fuel cells.

In operation, hydrogen gas from product stream 42 is delivered to the anode region, and oxidant 44 is delivered to the cathode region. A typical, but not exclusive, oxidant is oxygen. As used herein, hydrogen refers to hydrogen gas and oxygen refers to oxygen gas. The following discussion will refer to hydrogen as the proton source, or fuel, for the fuel cell (stack), and oxygen as the oxidant, although it is within the scope of the present disclosure that other fuels and/or oxidants may be used. Hydrogen and oxygen 44 may be delivered to the respective regions of the fuel cell via any suitable mechanism from respective sources 46 and 48. Illustrative examples of suitable sources 48 of oxygen 44 include a pressurized tank of oxygen or air, or a fan, compressor, blower or other device for directing air to the cathode region.

Hydrogen and oxygen typically combine with one another via an oxidation-reduction reaction. Although membrane 29 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 29 also tends not to be electrically conductive, an external circuit 50 is the lowest energy path for the remaining electron, and is schematically illustrated in FIG. 3. In cathode region 32, electrons from the external circuit and protons from the membrane combine with oxygen to produce water and heat.

Also shown in FIG. 3 are an anode purge, or exhaust, stream 54, which may contain hydrogen gas, and a cathode air exhaust stream 55, which is typically at least partially, if not substantially, depleted of oxygen. Fuel cell stack 24 may include a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

In practice, a fuel cell stack 24 will typically contain a plurality of fuel cells with bipolar plate assemblies separating adjacent membrane-electrode assemblies. The bipolar plate assemblies essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device 52 and the energy-producing system 22.

For a constant output voltage, such as 12 volts or 24 volts, the output power may be determined by measuring the output current. The electrical output may be used to satisfy an applied load, such as from energy-consuming device 52. FIG. 1 schematically depicts that energy-producing system 22 may include at least one energy-storage device 78. Device 78, when included, may be adapted to store at least a portion of the electrical output, or power, 79 from the fuel cell stack 24. An illustrative example of a suitable energy-storage device 78 is a battery, but others may be used. Energy-storage device 78 may additionally or alternatively be used to power the energy-producing system 22 during start-up of the system.

The at least one energy-consuming device 52 may be electrically coupled to the energy-producing system 22, such as to the fuel cell stack 24 and/or one or more energy-storage devices 78 associated with the stack. Device 52 applies a load to the energy-producing system 22 and draws an electric current from the system to satisfy the load. This load may be referred to as an applied load, and may include thermal and/or electrical load(s). It is within the scope of the present disclosure that the applied load may be satisfied by the fuel cell stack, the energy-storage device, or both the fuel cell stack and the energy-storage device. Illustrative examples of devices 52 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, radios, electrically powered components on boats, recreational vehicles or other vehicles, battery chargers and even the balance-of-plant electrical requirements for the energy-producing system 22 of which fuel cell stack 24 forms a part. As indicated in dashed lines at 77 in FIG. 1, the energy-producing system may, but is not required to, include at least one power management module 77. Power management module 77 includes any suitable structure for conditioning or otherwise regulating the electricity produced by the energy-producing system, such as for delivery to energy-consuming device 52. Module 77 may include such illustrative structure as buck or boost converters, inverters, power filters, and the like.

Figure 4:
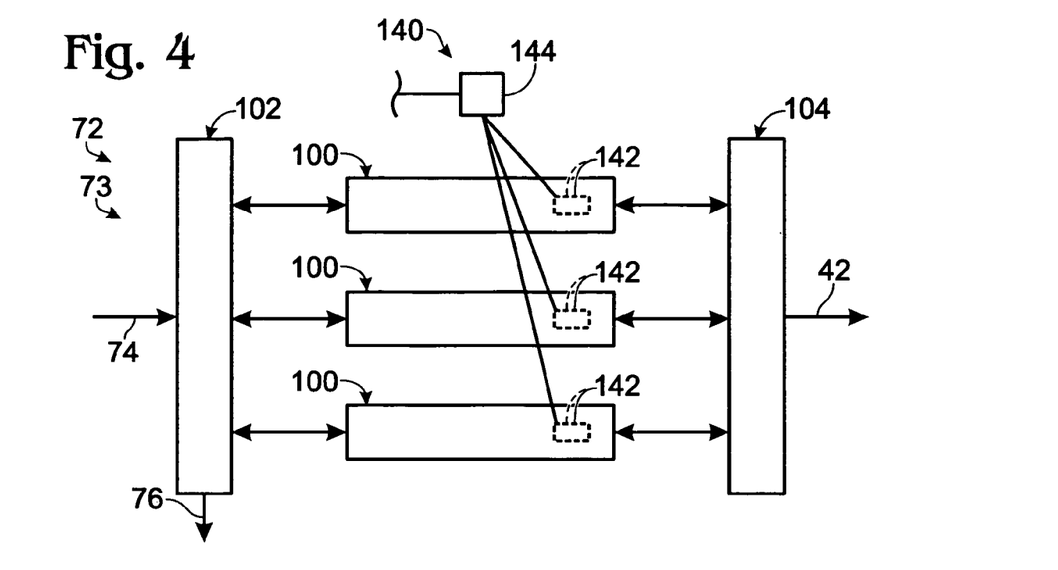
FIG. 4 is a schematic view of a pressure swing adsorption assembly including a temperature-based breakthrough detection system according to the present disclosure.

In FIG. 4 an illustrative example of a PSA assembly 73 is shown. As shown, assembly 73 includes a plurality of adsorbent beds 100 that are fluidly connected via distribution assemblies 102 and 104. Beds 100 may additionally or alternatively be referred to as adsorbent chambers or adsorption regions. The distribution assemblies have been schematically illustrated in FIG. 4 and may include any suitable structure for selectively establishing and restricting fluid flow between the beds and/or the input and output streams of assembly 73. As shown, the input and output streams include at least mixed gas stream 74, product hydrogen stream 42, and byproduct stream 76. Illustrative examples of suitable structures include one or more of manifolds, such as distribution and collection manifolds that are respectively adapted to distribute fluid to and collect fluid from the beds, and valves, such as check valves, solenoid valves, purge valves, and the like. In the illustrative example, three beds 100 are shown, but it is within the scope of the present disclosure that the number of beds may vary, such as to include more or less beds than shown in FIG. 4. Typically, assembly 73 will include at least two beds, and often will include three, four, or more beds. While not required, assembly 73 is preferably adapted to provide a continuous flow of product hydrogen stream, with at least one of the plurality of beds exhausting this stream when the assembly is in use and receiving a continuous flow of mixed gas stream 74.

In the illustrative example, distribution assembly 102 is adapted to selectively deliver mixed gas stream 74 to the plurality of beds and to collect and exhaust byproduct stream 76, and distribution assembly 104 is adapted to collect the purified hydrogen gas that passes through the beds and which forms product hydrogen stream 42, and in some embodiments to deliver a portion of the purified hydrogen gas to the beds for use as a purge stream. The distribution assemblies may be configured for fixed or rotary positioning relative to the beds. Furthermore, the distribution assemblies may include any suitable type and number of structures and devices to selectively distribute, regulate, meter, prevent and/or collect flows of the corresponding gas streams. As illustrative, non-exclusive examples, distribution assembly 102 may include mixed gas and exhaust manifolds, or manifold assemblies, and distribution assembly 104 may include product and purge manifolds, or manifold assemblies. In practice, PSA assemblies that utilize distribution assemblies that rotate relative to the beds may be referred to as rotary pressure swing adsorption assemblies, and PSA assemblies in which the manifolds and beds are not adapted to rotate relative to each other to selectively establish and restrict fluid connections may be referred to as fixed bed, or discrete bed, pressure swing adsorption assemblies. Both constructions are within the scope of the present disclosure.

Gas purification by pressure swing adsorption involves sequential pressure cycling and flow reversal of gas streams relative to the adsorbent beds. In the context of purifying a mixed gas stream comprised substantially of hydrogen gas, the mixed gas stream is delivered under relatively high pressure to one end of the adsorbent beds and thereby exposed to the adsorbent(s) contained in the adsorbent region thereof. Illustrative examples of delivery pressures for mixed gas stream 74 include pressures in the range of 40-200 psi, such as pressures in the range of 50-150 psi, 50-100 psi, 100-150 psi, 70-100 psi, etc., although pressures outside of this range are within the scope of the present disclosure. As the mixed gas stream flows through the adsorbent region, carbon monoxide, carbon dioxide, water and/or other ones of the impurities, or other gases, are adsorbed, and thereby at least temporarily retained, on the adsorbent. This is because these gases are more readily adsorbed on the selected adsorbents used in the PSA assembly. The remaining portion of the mixed gas stream, which now may perhaps more accurately be referred to as a purified hydrogen stream, passes through the bed and is exhausted from the other end of the bed. In this context, hydrogen gas may be described as being the less readily adsorbed component, while carbon monoxide, carbon dioxide, etc. may be described as the more readily adsorbed components of the mixed gas stream. The pressure of the product hydrogen stream is typically reduced prior to utilization of the gas by the fuel cell stack.

To remove the adsorbed gases, the flow of the mixed gas stream is stopped, the pressure in the bed is reduced, and the now desorbed gases are exhausted from the bed. The desorption step often includes selectively decreasing the pressure within the adsorbent region through the withdrawal of gas, typically in a countercurrent direction relative to the feed direction. This desorption step may also be referred to as a depressurization, or blowdown, step. This step often includes or is performed in conjunction with the use of a purge gas stream, which is typically delivered in a countercurrent flow direction to the direction at which the mixed gas stream flows through the adsorbent region. An illustrative example of a suitable purge gas stream is a portion of the product hydrogen stream, as this stream is comprised of hydrogen gas, which is less readily adsorbed than the adsorbed gases. Other gases may be used in the purge gas stream, although these gases preferably are less readily adsorbed than the adsorbed gases, and even more preferably are not adsorbed, or are only weakly adsorbed, on the adsorbent(s) being used.

As discussed, this desorption step may include drawing an at least partial vacuum on the bed, but this is not required. While not required, it is often desirable to utilize one or more equalization steps, in which two or more beds are fluidly interconnected to permit the beds to equalize the relative pressures therebetween. For example, one or more equalization steps may precede the desorption and pressurization steps. Prior to the desorption step, equalization is used to reduce the pressure in the bed and to recover some of the purified hydrogen gas contained in the bed, while prior to the (re)pressurization step, equalization is used to increase the pressure within the bed. Equalization may be accomplished using cocurrent and/or countercurrent flow of gas. After the desorption and/or purge step(s) of the desorbed gases is completed, the bed is again pressurized and ready to again receive and remove impurities from the portion of the mixed gas stream delivered thereto.

For example, when a bed is ready to be regenerated, it is typically at a relatively high pressure and contains a quantity of hydrogen gas. While this gas (and pressure) may be removed simply by venting the bed, other beds in the assembly will need to be pressurized prior to being used to purify the portion of the mixed gas stream delivered thereto. Furthermore, the hydrogen gas in the bed to be regenerated preferably is recovered so as to not negatively impact the efficiency of the PSA assembly. Therefore, interconnecting these beds in fluid communication with each other permits the pressure and hydrogen gas in the bed to be regenerated to be reduced while also increasing the pressure and hydrogen gas in a bed that will be used to purify impure hydrogen gas (i.e., mixed gas stream 74) that is delivered thereto. In addition to, or in place of, one or more equalization steps, a bed that will be used to purify the mixed gas stream may be pressurized prior to the delivery of the mixed gas stream to the bed. For example, some of the purified hydrogen gas may be delivered to the bed to pressurize the bed. While it is within the scope of the present disclosure to deliver this pressurization gas to either end of the bed, in some embodiments it may be desirable to deliver the pressurization gas to the opposite end of the bed than the end to which the mixed gas stream is delivered.

The above discussion of the general operation of a PSA assembly has been somewhat simplified. Illustrative examples of pressure swing adsorption assemblies, including components thereof and methods of operating the same, are disclosed in U.S. Pat. Nos. 3,564,816, 3,986,849, 5,441,559, 6,692,545, and 6,497,856, the complete disclosures of which are hereby incorporated by reference for all purposes.

Figure 5:
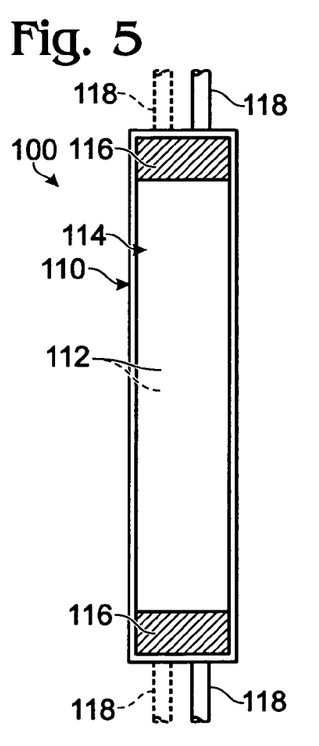
FIG. 5 is a schematic cross-sectional view of an adsorbent bed that may be used with PSA assemblies according to the present disclosure.

In FIG. 5, an illustrative example of an adsorbent bed 100 is schematically illustrated. As shown, the bed defines an internal compartment 110 that contains at least one adsorbent 112, with each adsorbent being adapted to adsorb one or more of the components of the mixed gas stream. It is within the scope of the present disclosure that more than one adsorbent may be used. For example, a bed may include more than one adsorbent adapted to adsorb a particular component of the mixed gas stream, such as to adsorb carbon monoxide, and/or two or more adsorbents that are each adapted to adsorb a different component of the mixed gas stream. Similarly, an adsorbent may be adapted to adsorb two or more components of the mixed gas stream. Illustrative examples of suitable adsorbents include activated carbon, alumina and zeolite adsorbents. An additional example of an adsorbent that may be present within the adsorbent region of the beds is a desiccant that is adapted to adsorb water present in the mixed gas stream. Illustrative desiccants include silica and alumina gels. When two or more adsorbents are utilized, they may be sequentially positioned (in a continuous or discontinuous relationship) within the bed or may be mixed together. It should be understood that the type, number, amount and form of adsorbent in a particular PSA assembly may vary, such as according to one or more of the following factors: the operating conditions expected. in the PSA assembly, the size of the adsorbent bed, the composition and/or properties of the mixed gas stream, the desired application for the product hydrogen stream produced by the PSA assembly, the operating environment in which the PSA assembly will be used, user preferences, etc.

When the PSA assembly includes a desiccant or other water-removal composition or device, it may be positioned to remove water from the mixed gas stream prior to adsorption of other impurities from the mixed gas stream. One reason for this is that water may negatively affect the ability of some adsorbents to adsorb other components of the mixed gas stream, such as carbon monoxide. An illustrative example of a water-removal device is a condenser, but others may be used between the hydrogen-producing region and adsorbent region, as schematically illustrated in dashed lines at 122 in FIG. 1. For example, at least one heat exchanger, condenser or other suitable water-removal device may be used to cool the mixed gas stream prior to delivery of the stream to the PSA assembly. This cooling may condense some of the water present in the mixed gas stream. Continuing this example, and to provide a more specific illustration, mixed gas streams produced by steam reformers tend to contain at least 10%, and often at least 15% or more water when exhausted from the hydrogen-producing (i.e., the reforming) region of the fuel processing system. These streams also tend to be fairly hot, such as having a temperature of at least 300° C. (in the case of many mixed gas streams produced from methanol or similar carbon-containing feedstocks), and at least 600-800° C. (in the case of many mixed gas streams produced from natural gas, propane or similar carbon-containing feedstocks). When cooled prior to delivery to the PSA assembly, such as to an illustrative temperature in the range of 25-100° C. or even 40-80° C., most of this water will condense. The mixed gas stream may still be saturated with water, but the water content will tend to be less than 5 wt %.

The adsorbent(s) may be present in the bed in any suitable form, illustrative examples of which include particulate form, bead form, porous discs or blocks, coated structures, laminated sheets, fabrics, and the like. When positioned for use in the beds, the adsorbents should provide sufficient porosity and/or gas flow paths for the non-adsorbed portion of the mixed gas stream to flow through the bed without significant pressure drop through the bed. As used herein, the portion of a bed that contains adsorbent will be referred to as the adsorbent region of the bed. In FIG. 5, an adsorbent region is indicated generally at 114. Beds 100 also may (but are not required to) include partitions, supports, screens and other suitable structure for retaining the adsorbent and other components of the bed within the compartment, in selected positions relative to each other, in a desired degree of compression, etc. These devices are generally referred to as supports and are generally indicated in FIG. 5 at 116. Therefore, it is within the scope of the present disclosure that the adsorbent region may correspond to the entire internal compartment of the bed, or only a subset thereof. Similarly, the adsorbent region may be comprised of a continuous region or two or more spaced apart regions without departing from the scope of the present disclosure.

Figure 6:
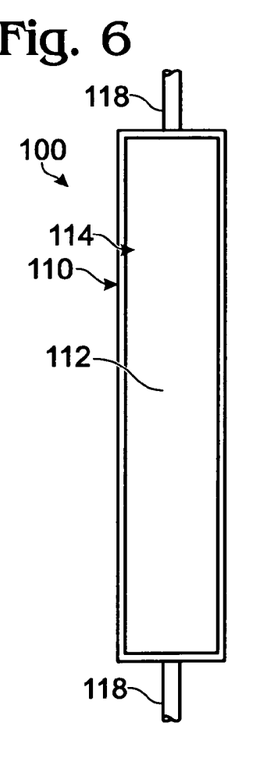
FIG. 6 is a schematic cross-sectional view of another adsorbent bed that may be used with PSA assemblies according to the present disclosure.
Figure 7:
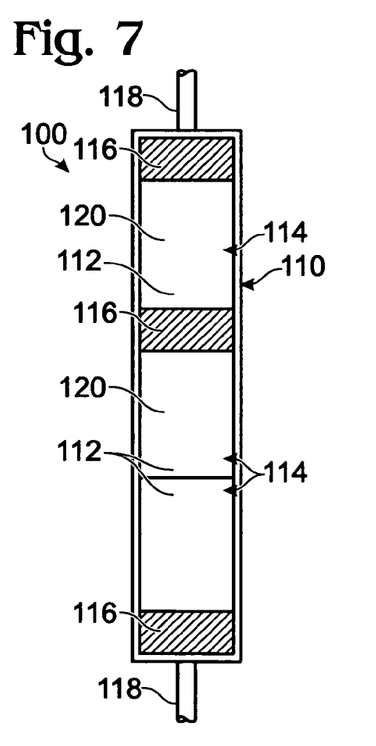
FIG. 7 is a schematic cross-sectional view of another adsorbent bed that may be used with PSA assemblies according to the present disclosure.

In the illustrated example shown in FIG. 5, bed 100 includes at least one port 118 associated with each end region of the bed. As indicated in dashed lines, it is within the scope of the present disclosure that either or both ends of the bed may include more than one port. Similarly, it is within the scope of the disclosure that the ports may extend laterally from the beds or otherwise have a different geometry than the schematic examples shown in FIG. 5. Regardless of the configuration and/or number of ports, the ports are collectively adapted to deliver fluid for passage through the adsorbent region of the bed and to collect fluid that passes through the adsorbent region. As discussed, the ports may selectively, such as depending upon the particular implementation of the PSA assembly and/or stage in the PSA cycle, be used as an input port or an output port. For the purpose of providing a graphical example, FIG. 6 illustrates a bed 100 in which the adsorbent region extends along the entire length of the bed, i.e., between the opposed ports or other end regions of the bed. In FIG. 7, bed 100 includes an adsorbent region 114 that includes discontinuous subregions 120.

During use of an adsorbent bed, such as bed 100, to adsorb impurity gases (namely the gases with greater affinity for being adsorbed by the adsorbent), a mass-transfer zone will be defined in the adsorbent region. More particularly, adsorbents have a certain adsorption capacity, which is defined at least in part by the composition of the mixed gas stream, the flow rate of the mixed gas stream, the operating temperature and/or pressure at which the adsorbent is exposed to the mixed gas stream, any adsorbed gases that have not been previously desorbed from the adsorbent, etc. As the mixed gas stream is delivered to the adsorbent region of a bed, the adsorbent at the end portion of the adsorbent region proximate the mixed gas delivery port will remove impurities from the mixed gas stream. Generally, these impurities will be adsorbed within a subset of the adsorbent region, and the remaining portion of the adsorbent region will have only minimal, if any, adsorbed impurity gases. This is somewhat schematically illustrated in FIG. 8, in which adsorbent region 114 is shown including a mass transfer zone, or region, 130.

As the adsorbent in the initial mass transfer zone continues to adsorb impurities, it will near or even reach its capacity for adsorbing these impurities. As this occurs, the mass transfer zone will move toward the opposite end of the adsorbent region. More particularly, as the flow of impurity gases exceeds the capacity of a particular portion of the adsorbent region (i.e., a particular mass transfer zone) to adsorb these gases, the gases will flow beyond that region and into the adjoining portion of the adsorbent region, where they will be adsorbed by the adsorbent in that portion, effectively expanding and/or moving the mass transfer zone generally toward the opposite end of the bed.

Figure 8:
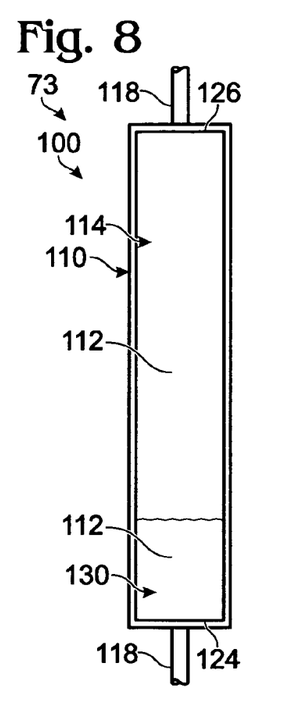
FIG. 8 is a schematic cross-sectional view of the adsorbent bed of FIG. 6 with a mass transfer zone being schematically indicated.
Figure 9:
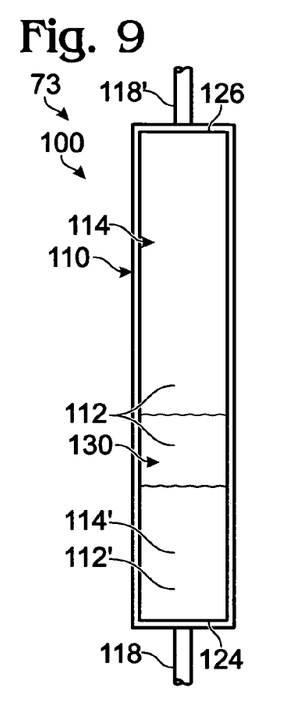
FIG. 9 is a schematic cross-sectional view of the adsorbent bed of FIG. 8 with the mass transfer zone moved along the adsorbent region of the bed toward a distal, or product, end of the adsorbent region.

This description is somewhat simplified in that the mass transfer zone often does not define uniform beginning and ending boundaries along the adsorbent region, especially when the mixed gas stream contains more than one gas that is adsorbed by the adsorbent. Similarly, these gases may have different affinities for being adsorbed and therefore may even compete with each other for adsorbent sites. However, a substantial portion (such as at least 70% or more) of the adsorption will tend to occur in a relatively localized portion of the adsorbent region, with this portion, or zone, tending to migrate from the feed end to the product end of the adsorbent region during use of the bed. This is schematically illustrated in FIG. 9, in which mass transfer zone 130 is shown moved toward port 118' relative to its position in FIG. 8. Accordingly, the adsorbent 112' in portion 114' of the adsorbent region will have a substantially reduced capacity, if any, to adsorb additional impurities. Described in other terms, adsorbent 112' may be described as being substantially, if not completely, saturated with adsorbed gases. In FIGS. 8 and 9, the feed and product ends of the adsorbent region are generally indicated at 124 and 126 and generally refer to the portions of the adsorbent region that are proximate, or closest to, the mixed gas delivery port and the product port of the bed.

During use of the PSA assembly, the mass transfer zone will tend to migrate toward and away from ends 124 and 126 of the adsorbent region. More specifically, and as discussed, PSA is a cyclic process that involves repeated changes in pressure and flow direction. The following discussion will describe the PSA cycle with reference to how steps in the cycle tend to affect the mass transfer zone (and/or the distribution of adsorbed gases through the adsorbent region). It should be understood that the size, or length, of the mass transfer zone will tend to vary during use of the PSA assembly, and therefore tends not to be of a fixed dimension.

At the beginning of a PSA cycle, the bed is pressurized and the mixed gas stream flows under pressure through the adsorbent region. During this adsorption step, impurities (i.e., the other gases) are adsorbed by the adsorbent(s) in the adsorbent region. As these impurities are adsorbed, the mass transfer zone tends to move toward the distal, or product, end of the adsorbent region as initial portions of the adsorbent region become more and more saturated with adsorbed gas. When the adsorption step is completed, the flow of mixed gas stream 74 to the adsorbent bed and the flow of purified hydrogen gas (at least a portion of which will form product hydrogen stream 42) are stopped. While not required, the bed may then undergo one or more equalization steps in which the bed is fluidly interconnected with one or more other beds in the PSA assembly to decrease the pressure and hydrogen gas present in the bed and to charge the receiving bed(s) with pressure and hydrogen gas. Gas may be withdrawn from the pressurized bed from either, or both of, the feed or the product ports. Drawing the gas from the product port will tend to provide hydrogen gas of greater purity than gas drawn from the feed port. However, the decrease in pressure resulting from this step will tend to draw impurities in the direction at which the gas is removed from the adsorbent bed. Accordingly, the mass transfer zone may be described as being moved toward the end of the adsorbent bed closest to the port from which the gas is removed from the bed. Expressed in different terms, when the bed is again used to adsorb impurities from the mixed gas stream, the portion of the adsorbent region in which the majority of the impurities are adsorbed at a given time, i.e., the mass transfer zone, will tend to be moved toward the feed or product end of the adsorbent region depending upon the direction at which the equalization gas is withdrawn from the bed.

The bed is then depressurized, with this step typically drawing gas from the feed port because the gas stream will tend to have a higher concentration of the other gases, which are desorbed from the adsorbent as the pressure in the bed is decreased. This exhaust stream may be referred to as a byproduct, or impurity stream ; 76 and may be used for a variety of applications, including as a fuel stream for a burner or other heating assembly that combusts a fuel stream to produce a heated exhaust stream. As discussed, hydrogen-generation assembly 46 may include a heating assembly 71 that is adapted to produce a heated exhaust stream to heat at least the hydrogen-producing region 70 of the fuel processing system. According to Henry's Law, the amount of adsorbed gases that are desorbed from the adsorbent is related to the partial pressure of the adsorbed gas present in the adsorbent bed. Therefore, the depressurization step may include, be followed by, or at least partially overlap in time, with a purge step, in which gas, typically at low pressure, is introduced into the adsorbent bed. This gas flows through the adsorbent region and draws the desorbed gases away from the adsorbent region, with this removal of the desorbed gases resulting in further desorption of gas from the adsorbent. As discussed, a suitable purge gas is purified hydrogen gas, such as previously produced by the PSA assembly. Typically, the purge stream flows from the product end to the feed end of the adsorbent region to urge the impurities (and thus reposition the mass transfer zone) toward the feed end of the adsorbent region. It is within the scope of the disclosure that the purge gas stream may form a portion of the byproduct stream, may be used as a combustible fuel stream (such as for heating assembly 71), and/or may be otherwise utilized in the PSA or other processes.

The illustrative example of a PSA cycle is now completed, and a new cycle is typically begun. For example, the purged adsorbent bed is then repressurized, such as by being a receiving bed for another adsorbent bed undergoing equalization, and optionally may be further pressurized by purified hydrogen gas delivered thereto. By utilizing a plurality of adsorbent beds, typically three or more, the PSA assembly may be adapted to receive a continuous flow of mixed gas stream 74 and to produce a continuous flow of purified hydrogen gas (i.e., a continuous flow of product hydrogen stream 42). While not required, the time for the adsorption step, or stage, often represents one-third to two-thirds of the PSA cycle, such as representing approximately half of the time for a PSA cycle.

It is important to stop the adsorption step before the mass transfer zone reaches the distal end (relative to the direction at which the mixed gas stream is delivered to the adsorbent region) of the adsorbent region. In other words, the flow of mixed gas stream 74 and the removal of product hydrogen stream 42 preferably should be stopped before the other gases that are desired to be removed from the hydrogen gas are exhausted from the bed with the hydrogen gas because the adsorbent is saturated with adsorbed gases and therefore can no longer effectively prevent these impurity gases from being exhausted in what desirably is a purified hydrogen stream. This contamination of the product hydrogen stream with impurity gases that desirably are removed by the PSA assembly may be referred to as breakthrough, in that the impurities gases "break through" the adsorbent region of the bed. Conventionally, carbon monoxide detectors have been used to determine when the mass transfer zone is nearing or has reached the distal end of the adsorbent region and thereby is, or will, be present in the product hydrogen stream. Carbon monoxide detectors are used more commonly than detectors for other ones of the other gases present in the mixed gas stream because carbon monoxide can damage many fuel cells when present in even a few parts per million (ppm). While effective, and within the scope of the present disclosure, this detection mechanism requires the use of carbon monoxide detectors and related detection equipment, which tends to be expensive and increase the complexity of the PSA assembly.

At least in the case of hydrogen purification by pressure swing adsorption, the adsorbent tends to be hotter in the mass transfer zone than in other portions of the adsorbent region, such as regions upstream, and especially downstream, from the mass transfer zone. This is due to the heat of adsorption of the adsorbed gases. This temperature differential may vary by such factors as the flow rate of the mixed gas stream, the type of adsorbent, the gas being adsorbed, the packing or other form of the adsorbent, etc., but the differential should be at least a few degrees Celsius. For example, the temperature differential may be at least 1° C., at least 2° C., at least 3° C., at least 5° C., or more. As discussed in more detail herein, system 140 may also be referred to as a temperature assembly adapted to measure the temperature of the adsorbent in at least one location, and preferably two or more locations, within or associated with the adsorbent region and to control the operation of the PSA assembly responsive at least in part thereto.

Returning to FIG. 4, it is schematically illustrated that PSA assemblies according to the present disclosure include a temperature-based breakthrough detection system 140 associated with each of the beds that will be used to purify mixed gas stream 74. System 140 is adapted to detect the temperature of the adsorbent (directly or indirectly) in at least one portion of the adsorbent region of each bed 100. As such, system 140 includes at least one temperature sensor, or detector, 142 adapted to detect the temperature in or associated with a portion of the adsorbent region of each bed, and at least one controller 144 adapted to control the operation of the PSA assembly, and optionally additional portions of the hydrogen-generation assembly and/or fuel cell system, responsive at least in part thereto. System 140 may also be referred to as a temperature-based breakthrough prevention system and/or a temperature-based control system, in that it is adapted to detect when the adsorbent bed is nearing and/or in a breakthrough condition and to control the operation of at least PSA assembly 73 responsive thereto to prevent breakthrough from occurring. As used herein, the term "breakthrough condition" refers to when the mass transfer zone of the adsorbent region is present in a distal, or product, end portion, or subregion, of the adsorbent region. This end portion may include a selected percentage of the adsorbent region, such as the final third, or subsets thereof, such as 30%, 25%, 20%, 15%, 10%, 5%, or less, of the adsorbent region (i.e., the portion of the adsorbent region closest to the product port). In other terms, a breakthrough condition occurs when a substantial portion of the adsorption of at least one of the other gases occurs in the distal (i.e. away from the feed port) end portion of the adsorbent region. As discussed herein, system 140 is adapted to detect a breakthrough condition by detecting the temperature of at least a portion of the adsorbent in the adsorbent region and comparing this temperature to a reference temperature.

Figure 10:
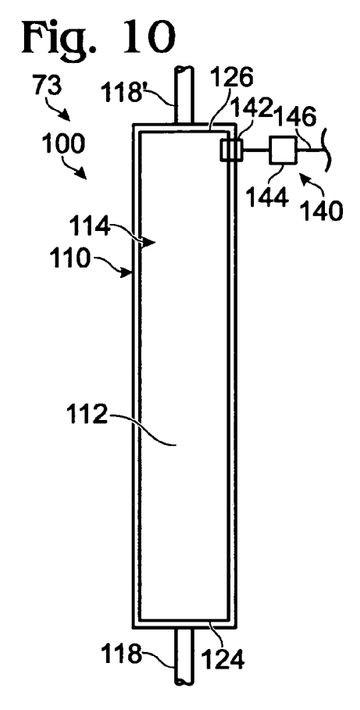
FIG. 10 is a schematic cross-sectional view of a portion of a PSA assembly that includes at least one adsorbent bed and a temperature-based breakthrough detection system according to the present disclosure.

Temperature sensor 142 may include any suitable device or mechanism adapted to detect (directly or indirectly) the temperature of adsorbent within a selected portion of the adsorbent region. Thermocouples are an illustrative, non-exclusive example of a suitable device. In FIG. 10, only a single temperature sensor 142 is shown. It is within the scope of the present disclosure that more than one sensor may be utilized. For example, in FIG. 11, an illustrative bed 100 is shown with a plurality of temperature sensors 142 spaced along the length of the adsorbent region. As illustrated, a series of eight temperature sensors are shown and spaced along the length of the adsorbent region. It is within the scope of the present disclosure that more or less sensors may be used, including using more than one sensor to detect the temperature at a given position along the length of the adsorbent region. While not required for the detection of a breakthrough condition or other impending passage of impurities through the adsorbent region, having one or more temperature sensors located along the intermediate region of the bed and/or the feed end region of the bed may be desirable in some embodiments, such as to enable system 140 to determine the relative location of the mass transfer zone within the bed instead of simply determining whether the mass transfer zone is within a distal end portion of the adsorbent region.

Figure 12:
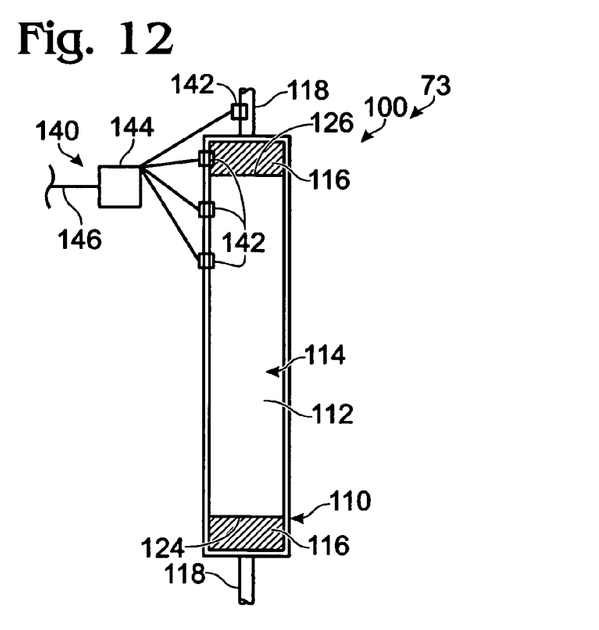
FIG. 12 is a schematic cross-sectional view of a portion of a PSA assembly that includes at least one adsorbent bed and a temperature-based breakthrough detection system according to the present disclosure.

As illustrated in dashed lines in FIG. 12, it is also within the scope of the present disclosure to include at least one temperature sensor associated with a portion of the bed outside of the adsorbent region and/or associated with one or more of ports 118, such as to detect the temperature of the gas flowing into and/or out of the adsorbent bed. By "associated with" it is meant that the temperature sensor may detect the actual temperature of the adsorbent or other structure whose temperature is desired to be measured, but this temperature may also be indirectly measured. An example of an indirect measurement is measuring the temperature of adjacent structure. In such a configuration, the actual temperature of the adsorbent or other structure may not be known, but the measured temperature will correspond generally to the actual temperature, and thereby may be used as an indirect, or relative, measurement of the desired temperature. Another example is to measure or otherwise detect a value that is proportional to the temperature to be measured. For example, when a thermocouple is used as a temperature sensor, the output from the thermocouple is a voltage, and the detected voltages, including relative differences and/or changes thereto may be used. As a further example, when a resistor is used to detect a temperature, the measured resistance of the resistor is proportional to the temperature.

Figure 11:
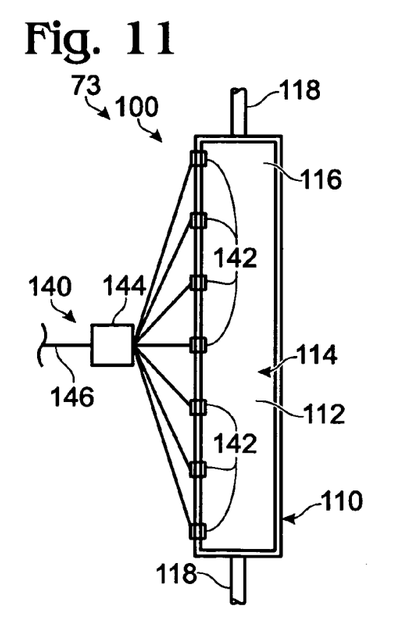
FIG. 11 is a schematic cross-sectional view of a portion of a PSA assembly that includes at least one adsorbent bed and a temperature-based breakthrough detection system according to the present disclosure.

In FIGS. 10-12, bed 100 is schematically illustrated, and it is within the scope of the present disclosure that any suitable construction may be utilized, including those discussed, incorporated and/or illustrated herein. Similarly, sensors 142 have been graphically illustrated in FIGS. 10-12 extending partially within and partially outside of bed 100 to schematically represent that the sensors may be located at any suitable position relative to the adsorbent or other structure to be measured. For example, this may include positions in which a portion of the sensor extends in direct contact with the adsorbent or other structure within the bed and/or positions in which the sensor is positioned external to the adsorbent region or even external the bed. Externally positioned sensors may detect the temperature of the adsorbent indirectly, such as through heat conducted from the adsorbent.

Controller 144 includes any suitable type and number of devices or mechanisms for comparing the measured temperature from at least one sensor 142 to at least one reference temperature and generating at least an output signal responsive thereto if the measured temperature differs from the reference temperature by more than a preselected threshold value. As illustrative, non-exclusive examples, controller 144 may include one or more analog or digital circuits, logic units or processors for operating programs stored as software in memory, one or more discrete units in communication with each other, etc. Controller 144 may also regulate or control other portions of the hydrogen-generation assembly or fuel cell system and/or may be in communication with other controllers adapted to control the operation of the hydrogen-generation assembly and/or fuel cell system. Controller 144 is illustrated in FIG. 4 as being implemented as a discrete unit. It may also be implemented as separate components or controllers, such as a controller for each bed. Such separate controllers, then, can communicate with each other and/or with other controllers present in system 22 and/or assembly 46 via any suitable communication linkages. Further illustrative examples include a controller that receives the temperature detected by one or more sensors 142, compares the one or more measured temperatures with one or more reference temperatures, and generates, or selectively generates, an output signal responsive thereto. The output signal may be a command signal, such as to change the operating state of the PSA assembly, hydrogen-generation assembly and/or fuel cell system, and/or it may include a value or input that is received and processed by another controller to generate a desired change in operating state. In FIGS. 10-12, reference numeral 146 schematically indicates that the controller is adapted to generate one or more output signal responsive at least in part to the one or more measured temperature and/or the relationship of this temperature to one or more reference temperatures or threshold values. As discussed, this relationship may include comparing the temperatures and/or values to determine if they deviate by more than a predetermined amount, if the measured temperature is within a predetermined range of the reference temperature or value, if the measured temperature is equal to, at least as great as, and/or greater than the reference temperature, etc.

Illustrative examples of suitable reference temperatures include stored or previously measured temperatures or values. Other examples include another temperature measured by system 140, such as a temperature measured upstream (i.e., in the direction of the fuel processing system or other source of mixed gas stream 74 relative to the PSA assembly) or downstream (i.e., in the direction of fuel cell stack 24 or other destination for product hydrogen stream 42 relative to the PSA assembly) from the measured temperature that is being compared to the reference temperature. For example, system 140 may be adapted to compare a measured temperature to previously measured temperatures from the sensor 142, to stored threshold values, and/or to one or more temperatures measured by other sensors 142. The previously measured and/or other threshold values may be stored in a memory portion of the controller. The memory portion may include volatile and/or non-volatile portions.

A benefit of a plurality of sensors spaced along the length of the adsorbent region is that the relative temperature within a particular region may be determined. For example, because the temperature of the adsorbent in region 114 tends to increase in the mass transfer zone, it may be desirable to compare the temperature of the adsorbent at or near the distal (relative to the mixed gas stream input port) end portion of the adsorbent region with the temperature of adsorbent upstream (i.e., closer to the feed end of the adsorbent region through which the mixed gas stream is introduced into the adsorbent region) from this reference temperature. As the mass transfer zone moves through the adsorbent region, the relative increase and subsequent decrease in temperature of adsorbent along the adsorbent region may provide an indicator of the position of the mass transfer zone within the adsorbent region. This, in turn, provides an indicator of how close the bed is to being saturated with adsorbent, i.e., when the bed is nearing or at a breakthrough condition. System 140 may be adapted to control the operation of at least the PSA assembly responsive at least in part to whether or not a breakthrough condition is detected.

Another potential benefit of using a measured temperature as a reference temperature is that the adsorbent bed, including adsorbent region 114 thereof, will tend to increase or decrease in temperature during use of the PSA assembly, such as responsive to such factors as the flow rate and/or temperature of the mixed gas stream being delivered to the bed, the stage of the PSA process in which a bed is currently configured, the operating conditions within the bed, the flow rate and/or temperature of any purge gas stream being delivered to the bed, etc. While an absolute temperature reading that is not correlated to any of these factors may be used in some embodiments, it may be desirable to compare or otherwise correlate a detected temperature with at least one of a previously detected threshold temperature or range of temperatures, a stored or preselected threshold temperature or range of temperatures, and/or one or more temperatures measured elsewhere in the PSA assembly or the fluid streams associated therewith, such as (but not limited to), upstream or downstream in the same adsorbent region, elsewhere in the adsorbent bed, in the fluid streams delivered to or removed from the bed, etc. Therefore, by measuring the temperature of the adsorbent within the adsorbent region, system 140 may be adapted to determine the degree of saturation of the adsorbent within the adsorbent region, the relative location of the mass transfer zone within the adsorbent region, when the mass transfer zone nears or reaches the distal end or end portion of the adsorbent region, etc.

Upon detection of a measured temperature that exceeds a reference temperature or threshold value, controller 144 may be adapted to directly or indirectly alter the operation of the PSA assembly responsive at least in part thereto to prevent actual breakthrough from occurring. Illustrative threshold values include predetermined threshold temperatures and temperature ranges corresponding to currently or previously measured temperatures or threshold temperatures, such as +/−1° C., 2° C., 3° C., 5° C., etc. Illustrative examples of these responses include one or more of the following: shortening or otherwise changing the cycle time of the PSA assembly, shortening the adsorption time in the cycle, stopping the flow of mixed gas stream to the bed and starting the depressurization (and optionally at least one of the equalization step and the purge step), increasing the purge time in the cycle, increasing the flow rate of purge gas during the purge step, interrupting or stopping the flow of the mixed gas stream through the adsorbent bed and/or the PSA assembly, shutting down the PSA assembly (and/or the hydrogen-generation assembly and/or the fuel cell system), alerting an operator, stopping the purge step, etc.

While it is within the scope of the present disclosure, it is not required for all embodiments that system 140 shutdown or otherwise alter the operating state of the PSA assembly (or hydrogen-generation assembly 46 or fuel cell system 22) immediately upon detecting a breakthrough condition. For example, the composition and/or flow rate of mixed gas stream through the adsorbent region, including the portion thereof proximate a particular temperature sensor, may fluctuate during use of the PSA assembly. While these flows and compositions are preferably relatively steady or constant, it should be appreciated that variations and fluctuations tend to occur. Accordingly, a detected breakthrough condition may cease to be detected shortly thereafter initial detection. Accordingly, in some embodiments, it may be desirable for system 140 to not stop or otherwise alter the operation of the PSA assembly (and/or assembly 46 and/or system 22) until a breakthrough condition is detected and remains detected for more than a selected time period (such as at least 1 second, 5 seconds, 10 seconds, 30 seconds, etc.) and/or is detected in two or more sequential PSA cycles. Relatedly, in some embodiments, it may be desirable for the measured temperature to be measured upstream from the distal end of the adsorbent region to provide a region of adsorbent between the adsorbent whose temperature is detected and the distal end of the adsorbent region. For example, detecting the measured temperature associated with the adsorbent within the distal third (or less of the adsorbent region) but not within the final 20%, 10%, 5% or 3% of the adsorbent region may provide a period of time to confirm the presence of a breakthrough condition and implement a desired change in the operating state of the PSA assembly (and/or assembly 46 and/or system 22).

Upon detection of a breakthrough condition, system 140 may be adapted to shutdown the PSA assembly (and/or an associated hydrogen-generation assembly 46 and/or fuel cell system 22). This shutdown may be implemented via any suitable sequence of steps, such as ranging from an immediate shutdown of the assembly and all associated systems, to a controlled shutdown in which the assembly (and associated devices) follow a prescribed sequence of shutdown steps. For example, the shutdown step may include equalizing the bed to harvest the hydrogen gas contained therein and to utilize at least some of the pressure within the bed. As another example, the shutdown steps may include cycling the PSA assembly through one or more, such as 2-20, 3-10, 4-8, 6, etc. shorter PSA cycles. A benefit of shutting down the PSA assembly with a series of shorter PSA cycles is that the adsorbent bed may be regenerated and thereby ready for use when the system is started up again. A variation of shorter overall PSA cycles is a longer purge step and/or greater purge volume of gas relative to the purge and adsorption steps utilized in the PSA cycles prior to beginning the shutdown routine.

Another suitable response by system 140 to the detection of a breakthrough condition is to cause, such as through suitable input or command signals, the PSA assembly to stop the adsorption step of the bed in which the breakthrough condition is detected and to transition to another bed for purifying the mixed gas stream. As discussed, this may include stopping the flow of mixed gas stream to the bed in which the breakthrough condition was detected and/or the flow of product hydrogen stream from the bed, equalizing the bed, depressurizing and purging the bed, etc.

A further example of a suitable response by system 140 to the detection of a breakthrough condition is to continue to operate the PSA assembly but with a shorter cycle time and/or a longer purge time and/or greater flow rate of purge gas, as compared to these relative values as utilized in the PSA cycle prior to the detection of the breakthrough condition. For example, upon detection of a breakthrough condition, system 140 may be adapted to shorten at least one of the overall cycle time or the adsorption time by a predetermined increment, such as 5%, 10%, 15%, or more. The PSA assembly may then continue to be operated with this new cycle time. If the breakthrough condition continues to be detected, the cycle time may again be decreased by , the same or a different predetermined increment. System 140 may (but is not required) to shutdown the PSA assembly if the cycle time or adsorption time reach or exceed preselected minimum cycle times or adsorption times.

Similar to the above-discussed variants of illustrative shutdown routines, a variant of the above response (i.e., shortening the cycle time and/or the adsorption time) is to lengthen the purge time and/or increase the flow rate of purge gas. Preferably, the decrease in adsorption or cycle time and/or the increase in purge time and/or purge flow should urge the mass transfer zone toward the feed end of the adsorption region. As a further variant, system 140 may be adapted to follow the decrease in cycle or adsorption time with an increase in this time (and/or decrease in the purge time/flow) by a second predetermined increment. This second increment may be the same as, shorter than, or longer than the increment by which the time was previously decreased. As discussed, the shorter cycle time or other corrective steps may be sufficient to partially regenerate the adsorbent, and thereby move the mass transfer zone away from the distal end of the adsorbent region. Therefore, the cycle time may be returned to or toward its original state. Should the breakthrough condition be subsequently detected again, the time may again be decreased by a predetermined increment, etc. System 140 may be adapted to wait until the breakthrough condition is not detected in any of the beds and/or not detected for a selected number of cycles, such as 2 cycles, 3 cycles, 5-10 cycles, etc., before increasing the cycle time or otherwise returning the operating conditions to or toward the original conditions.

Another illustrative response to the detection of a breakthrough condition by system 140 is an alert, such as to an operator or other user. The alert may be provided via any suitable mechanism and may be generated proximate the PSA assembly and/or remote from the assembly. For example, the alert may be implemented with audible and/or visual signals, electronic signals, electronic notices, and the like. When system 140 is adapted to generate an alert responsive to the detection of a breakthrough condition, it may be further adapted to generate one or more of a plurality of alerts, such as depending upon such factors as the elapsed time since the breakthrough condition was detected, the number of PSA cycles elapsed since the breakthrough condition was detected, the portion of the adsorbent region in which the breakthrough condition was detected, the proximity of the adsorbent in which the breakthrough condition was detected with the distal end of the adsorbent region, etc. For example, a first alert may be generated upon initial detection of a breakthrough condition, with further (optionally distinguishable) alerts being generated as the breakthrough condition continues to be detected and/or as the location of the condition moves toward the distal end of the adsorbent region.

It is within the scope of the present disclosure that PSA assemblies 73 with temperature-based breakthrough detection systems 140 according to the present disclosure may implement more than one of the illustrative responses to the detection of a breakthrough condition described herein and/or may be adapted to detect any of the illustrative breakthrough conditions, or triggering events, described herein.

It is also within the scope of the present disclosure that the cycle time of the PSA assembly is determined by the temperature-based breakthrough detection system. In such an embodiment, the adsorption step proceeds until a breakthrough condition is detected by system 140. Any of the detection mechanisms and reference temperatures described herein may be utilized. When the breakthrough condition is detected, the controller may direct, such as via one or more output or command signals, the flow of the mixed gas stream to be stopped to the bed in which the breakthrough condition was detected, with the flow of mixed gas stream being directed to another bed in the PSA assembly. The bed in which the breakthrough condition was detected may proceed through its equalization, depressurization and/or purge steps, as discussed. These steps may have any suitable length, i.e. represent any suitable portion of the total cycle time of the PSA assembly. One or more of these steps may include a time that is previously selected, such as a fixed equalization time. Similarly, one or more of these times may be a percentage of the adsorption time. Typically, the time for these steps will be within 50-150% of the time for the separation system. As an illustrative example, equal times may be used, but it is within the scope of the present disclosure that times outside of this range may be used. This implementation differs in some respects from the prior examples in that the adsorption step may proceed until the breakthrough condition is detected instead of the cycle time being predetermined unless prematurely interrupted or stopped by the detection of a breakthrough condition.

Illustrative, non-exclusive examples of implementations of temperature-based breakthrough detection systems 140 include, but are not limited to, one or more of the following implementations, which may be implemented in one or more of a PSA assembly, a PSA assembly adapted to purify hydrogen gas, a hydrogen-generation assembly including a fuel processor adapted to produce a mixed gas stream containing hydrogen gas as its majority component and other gases and a PSA assembly adapted to produce a product hydrogen stream from the mixed gas stream, a PSA assembly adapted to remove impurities from a hydrogen-rich stream for a fuel cell stack, a fuel cell system containing a fuel cell stack, a hydrogen-purifying PSA assembly and a source of hydrogen gas to be purified by the PSA assembly (with the source optionally including a fuel processor, and in some embodiments a steam reformer), and a hydrogen-generation assembly including a fuel processor adapted to produce a mixed gas stream containing hydrogen gas as its majority component and other gases and a PSA assembly adapted to remove impurities (including carbon monoxide) from the mixed gas stream (and optionally a fuel cell stack adapted to receive at least a portion of the purified mixed gas stream):

A temperature-based detection system adapted to determine the cycle time for a PSA assembly responsive at least in part to a measured temperature within the adsorbent region of the assembly.

A temperature-based detection system adapted to determine the cycle time for a PSA assembly responsive at least in part to the relationship between a measured temperature within the adsorbent region of the assembly and a reference temperature.

A temperature-based detection system adapted to determine the cycle time for a PSA assembly responsive at least in part to the relationship between a measured temperature within the adsorbent region and a reference temperature that is also associated with one or more of another portion of the adsorbent region, the gas flowing into, through or out of an adsorbent bed, and components of the adsorbent bed.

A temperature-based detection system adapted to detect impending breakthrough of carbon monoxide in an adsorbent region of a PSA assembly without measuring the concentration of carbon monoxide in or associated with the adsorbent region, and optionally without measuring the concentration of any gases in or associated with the adsorbent region.

A temperature-based detection system adapted to establish the adsorption time for a PSA cycle based upon one or more temperatures measured within an adsorbent bed of the PSA assembly, and optionally upon one or more temperatures measured in an adsorbent region thereof.

A temperature-based detection system adapted to prevent breakthrough in an adsorbent bed of a PSA assembly by monitoring at least one measured temperature associated with the adsorbent bed, and optionally, the adsorbent in the adsorbent bed, and comparing the at least one measured temperature to at least one reference temperature.

A temperature-based detection system adapted to determine the position of the, or the primary, mass transfer zone within an adsorbent region of an adsorbent bed of a PSA assembly.

A temperature-based detection system adapted to decrease the PSA cycle time in a PSA assembly responsive at least in part to one or more measured temperatures associated with the adsorbent in an adsorbent region of the PSA assembly.

A temperature-based detection system adapted to shutdown a PSA assembly, a hydrogen-generation assembly adapted to produce a hydrogen-containing mixed gas stream to be purified into a product hydrogen stream by the PSA assembly, and/or a fuel cell stack adapted to receive at least a portion of the product hydrogen stream responsive at least in part to one or more measured temperatures associated with the adsorbent in an adsorbent region of the PSA assembly.

A temperature-based detection system adapted to stop the adsorption step of a PSA cycle responsive at least in part to one or more measured temperatures associated with the adsorbent in an adsorbent region of the PSA assembly.

A temperature-based detection system adapted to generate at least one alert or other notification responsive at least in part to one or more measured temperatures associated with the adsorbent in an adsorbent region of the PSA assembly.

A temperature-based detection system adapted to control the operation and/or change the operating state of a fuel processing system adapted to produce a mixed gas stream to be purified by a PSA assembly responsive at least in part to one or more measured temperatures associated with the adsorbent in an adsorbent region of the PSA assembly.

A temperature-based detection system adapted to control the operation and/or change the operating state of a fuel cell system containing a PSA assembly responsive at least in part to one or more measured temperatures associated with the adsorbent in an adsorbent region of the PSA assembly.

A temperature-based detection system adapted to detect a breakthrough condition in a PSA assembly, including in an adsorbent bed thereof and/or in an adsorbent region of an adsorbent bed thereof.

A temperature-based detection system adapted to detect a breakthrough condition in a PSA assembly, including in an adsorbent bed thereof and/or in an adsorbent region of an adsorbent bed thereof, and responsive at least in part thereto to adjust or otherwise control the operation of at least the PSA assembly, and optionally an associated fuel processing system, fuel cell stack, hydrogen-generation assembly and/or fuel cell system.

A temperature-based detection system adapted to selectively increase and/or decrease one or more of the adsorption time, the overall PSA cycle time, the purge time and/or the fuel gas flow rate responsive to one or more measured temperatures associated with adsorbent in an adsorbent region of the PSA assembly.

Any of the above detection systems in which the system is adapted to compare one or more measured temperatures with one or more reference temperatures, with the reference temperatures selectively including one or more measured temperatures, one or more stored values, one or more previously measured temperatures and/or one or more threshold values.

Any of the above detection systems in which the system is adapted to determine if a measured temperature is within a predetermine range (above and/or below) of one or more reference temperatures, equals one or more reference temperatures, and/or exceeds one or more reference temperatures.

Any of the above detection systems in which the system is adapted to compare one or more measured temperatures with one or more reference temperatures, with the reference temperatures selectively including one or more measured temperatures, one or more stored values, one or more previously measured temperatures and/or one or more threshold values.

Any of the above detection systems, and implementations thereof, expressed as a temperature-based breakthrough prevention system.

Any of the above detection systems implemented with a PSA assembly having a plurality of adsorbent beds adapted to receive a mixed gas stream that includes hydrogen gas as its majority component and which is produced by a fuel processing system that includes at least one reforming region adapted to produce the mixed gas stream by steam reforming water and a carbon-containing feedstock, with at least the reforming region(s) of the fuel processing system adapted to be heated by a heating assembly, optionally with the PSA assembly adapted to provide at least one fuel stream to the heating assembly, and optionally in further combination with a fuel cell stack adapted to receive at least a portion of the purified hydrogen gas produced by the PSA assembly.

Methods for implementing the processes of any of the above systems and/or use of any of the above systems.

Although discussed herein in the context of a PSA assembly for purifying hydrogen gas, it is within the scope of the present disclosure that the PSA assembly and/or temperature-based breakthrough detection system disclosed herein may be used in other applications, such as to purify other mixed gas streams in fuel cell or other systems.

INDUSTRIAL APPLICABILITY

The pressure swing adsorption assemblies and hydrogen-generation and/or fuel cell systems including the same are applicable in the gas generation and fuel cell fields, including such fields in which hydrogen gas is generated, purified and/or consumed to produce an electric current.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A hydrogen-generation assembly, comprising:
a hydrogen-producing fuel processing system adapted to produce a mixed gas stream containing hydrogen gas and other gases from at least one feedstock; and
a pressure swing adsorption assembly adapted to receive at least a portion of the mixed gas stream and to remove impurities therefrom to produce a product hydrogen stream having greater hydrogen purity than the mixed gas stream, the pressure swing adsorption assembly comprising:
- a plurality of adsorbent beds, each bed including an adsorbent region containing adsorbent adapted to adsorb at least one of the other gases; and
- a temperature-based detection system, comprising:
  - at least one temperature sensor adapted to measure a temperature associated with a portion of the adsorbent region; and
  - a controller adapted to compare the temperature associated with a portion of the adsorbent region with at least one reference temperature that includes a temperature associated with a second portion of the adsorbent region and to selectively control the operation of at least the pressure swing adsorption assembly responsive at least in part thereto.

2. The assembly of claim 1, in combination with a fuel cell stack adapted to produce an electric current from an oxidant and at least a portion of the product hydrogen stream.

3. The assembly of claim 2, wherein the temperature-based detection system is further adapted to control the operation of the fuel processing system responsive at least in part to the relationship of the measured temperature and a reference temperature.

4. The assembly of claim 1, wherein the adsorbent region includes a feed end and a product end, and further wherein the second portion of the adsorbent region is spaced away from the product end.

5. The assembly of claim 1, wherein the second portion of the adsorbent region is located downstream from the portion of the adsorbent region, as measured in the direction of mixed gas flow through the adsorbent region during the adsorption process.

6. The assembly of claim 1, wherein the at least one reference temperature includes at least one of a previously measured temperature, a stored value, and a predetermined threshold value.

7. The assembly of claim 1, wherein the controller is adapted to detect whether or not a breakthrough condition exists in the adsorbent region responsive at least in part to the measured temperature.

8. The assembly of claim 1, wherein the at least one temperature sensor includes at least a first temperature sensor adapted to measure the temperature associated with a portion of the adsorbent region and a second temperature sensor adapted to measure a temperature associated with the adsorbent bed.

9. The assembly of claim 1, wherein the pressure swing adsorption assembly is adapted to reduce the concentration of the other gases in the mixed gas stream through a PSA cycle that includes at least pressurization, adsorption, depressurization, and purge steps and which has a cycle time.

10. The assembly of claim 9, wherein the PSA cycle further includes at least one equalization step in which at least two of the plurality of adsorbent beds are fluidly interconnected for gas flow between the beds.

11. The assembly of claim 9, wherein the temperature-based detection system is adapted to stop the adsorption step in the PSA cycle responsive to the relationship between the measured temperature and a reference temperature.

12. The assembly of claim 9, wherein the temperature-based detection system is adapted to stop the purge step in the PSA cycle responsive to the relationship between the measured temperature and the reference temperature.

13. The assembly of claim 9, wherein the temperature-based detection system is adapted to transition to at least one of the depressurization and the purge steps of the PSA cycle responsive to the relationship between the measured temperature and a reference temperature.

14. The assembly of claim 9, wherein the temperature-based detection system is adapted to reduce the cycle time of the PSA cycle by a predetermined increment responsive to the relationship between the measured temperature and a reference temperature.

15. The assembly of claim 9, wherein the cycle time includes a time period associated with each of the steps in the PSA cycle, and further wherein the temperature-based detection system is adapted to reduce the time period associated with the adsorption step of the PSA cycle by a predetermined increment responsive to the relationship between the measured temperature and a reference temperature.

16. The assembly of claim 9, wherein the cycle time includes a time period associated with each of the steps in the PSA cycle, and further wherein the temperature-based detection system is adapted to increase the time period associated with the purge step of the PSA cycle responsive to the relationship between the measured temperature and a reference temperature.

17. The assembly of claim 9, wherein the cycle time includes a time period associated with each of the steps in the PSA cycle, and further wherein the temperature-based detection system is adapted to increase the time period associated with the purge step of the PSA cycle by a predetermined increment responsive to the relationship between the measured temperature and a reference temperature.

18. The assembly of claim 1, wherein the temperature-based detection system is adapted to shutdown at least the pressure swing adsorption assembly responsive to the relationship between the measured temperature and a reference temperature.

19. The assembly of claim 1, wherein the temperature-based detection system is further adapted to control the operation of the fuel processing system responsive at least in part to the relationship of the measured temperature and a reference temperature.

20. A method for preventing breakthrough in a pressure swing adsorption assembly comprising at least one adsorbent bed having an adsorbent region containing at least one adsorbent adapted to adsorb impurities in an impure hydrogen stream to produce a purified hydrogen stream therefrom, the method comprising:
- detecting a measured temperature associated with a portion of the adsorbent region;
- detecting a reference temperature associated with a second portion of the adsorbent region downstream from the portion of the adsorbent region from which the measured temperature is detected;
- comparing the measured temperature and the reference temperature; and
- automatically adjusting the operation of the pressure swing adsorption assembly responsive to the measured temperature exceeding the reference temperature by more than a threshold value.

21. The method of claim 20, wherein the threshold value is at least 2° C.

22. The method of claim 20, wherein the adsorbent region includes a feed end and a product end, and further wherein the second portion of the adsorbent region is spaced away from the product end.

23. The method of claim 20, wherein the automatically adjusting includes adjusting at least one operating parameter of the pressure swing adsorption assembly.

24. The method of claim 23, wherein the at least one operating parameter includes a time period in which the impure hydrogen stream flows through the adsorbent region in which the measured temperature is detected.

25. The method of claim 20, wherein the pressure swing adsorption assembly is adapted to reduce the concentration of the impurities in the impure hydrogen stream through a PSA cycle that includes at least pressurization, adsorption, depressurization, and purge steps and which has a cycle time, and further wherein the automatically adjusting includes changing a time period associated with at least one of the steps in the PSA cycle.

26. The method of claim 20, wherein the automatically adjusting includes shutting down the pressure swing adsorption assembly.

27. The method of claim 20, wherein the automatically adjusting includes reducing the pressure in the adsorbent bed in which the measured temperature is detected and withdrawing a stream containing desorbed gases from the bed.

28. A method for operating a pressure swing adsorption assembly comprising at least one adsorbent bed having an adsorbent region containing at least one adsorbent adapted to adsorb impurities in an impure hydrogen stream to produce a purified hydrogen stream therefrom, the method comprising:
  delivering under pressure a mixed gas stream containing hydrogen gas and other gases to an adsorbent bed having an adsorbent region containing adsorbent adapted to adsorb at least one of the other gases from the mixed gas stream;
  detecting a measured temperature associated with adsorbent in a portion of the adsorbent region; and
  continuing the delivering step until the measured temperature exceeds a reference temperature associated with adsorbent in another portion of the adsorbent region.

29. The method of claim 28, wherein the method further includes producing the mixed gas stream in a fuel processing assembly adapted to produce the mixed gas stream from at least one feed stream.

30. The method of claim 28, wherein the method further includes detecting the reference temperature.

31. The method of claim 30, wherein the reference temperature is associated with adsorbent in a downstream portion of the adsorbent region.

32. The method of claim 30, wherein the reference temperature includes at least one of a previously measured temperature and a threshold value.

33. The method of claim 28, wherein the continuing step is maintained until the measured temperature exceeds the reference temperature by more than a predetermined value.

34. A hydrogen-generation assembly, comprising:
  a hydrogen-producing fuel processing system adapted to produce a mixed gas stream containing hydrogen gas and other gases from at least one feedstock; and
  a pressure swing adsorption assembly adapted to receive at least a portion of the mixed gas stream and to remove impurities therefrom to produce a product hydrogen stream having greater hydrogen purity than the mixed gas stream, the pressure swing adsorption assembly comprising:
    a plurality of adsorbent beds, each bed including an adsorbent region containing adsorbent adapted to adsorb at least one of the other gases; and
    a temperature-based detection system, comprising:
      a first temperature sensor adapted to measure a temperature associated with a portion of the adsorbent region and a second temperature sensor adapted to measure a temperature associated with the adsorbent bed; and
      a controller adapted to compare the temperature associated with a portion of the adsorbent region with the temperature associated with the adsorbent bed and to selectively control the operation of at least the pressure swing adsorption assembly responsive at least in part thereto.

* * * * *